(12) United States Patent
Johansson et al.

(10) Patent No.: US 12,224,679 B2
(45) Date of Patent: Feb. 11, 2025

(54) METHODS AND MEANS FOR FAILURE HANDLING IN PROCESS CONTROL SYSTEMS

(71) Applicant: ABB Schweiz AG, Baden (CH)

(72) Inventors: Bjarne Johansson, Västerås (SE); Mats Rågberger, Västerås (SE)

(73) Assignee: ABB Schweiz AG, Baden (CH)

( * ) Notice: Subject to any disclaimer, the term of this patent is extended or adjusted under 35 U.S.C. 154(b) by 125 days.

(21) Appl. No.: 18/047,935

(22) Filed: Oct. 19, 2022

(65) Prior Publication Data

US 2024/0136942 A1 Apr. 25, 2024
US 2024/0235418 A9 Jul. 11, 2024

(30) Foreign Application Priority Data

Oct. 22, 2021 (EP) ..................... 21204217

(51) Int. Cl.
*H02M 7/48* (2007.01)
*H02M 1/00* (2007.01)

(52) U.S. Cl.
CPC ........... *H02M 7/48* (2013.01); *H02M 1/0074* (2021.05)

(58) Field of Classification Search
CPC .. H04L 63/101; H04L 63/0807; G05B 19/042
See application file for complete search history.

(56) References Cited

U.S. PATENT DOCUMENTS

2021/0208971 A1* 7/2021 Srinivasan ............ G06F 9/5077

OTHER PUBLICATIONS

Extended European Search Report; Application No. 21204217.0; Completed: Mar. 10, 2022; Issued: Mar. 21, 2022; 8 Pages.

* cited by examiner

*Primary Examiner* — Zoheb S Imtiaz
(74) *Attorney, Agent, or Firm* — Whitmyer IP Group LLC

(57) ABSTRACT

A method in a system is provided for handling failures in a process control system including a plurality of compute nodes. The process control system includes at least two instances of virtualized distributed control nodes, VDCNs, deployed in a respective compute node of a cluster of at least two compute nodes, wherein a first VDCN is a primary VDCN controlling an automated process and at least a second VDCN is a backup VDCN. The method includes detecting that the number of instances of the VDCNs is less than a set number and assigning the role of primary VDCN to the second VDCN. A device, computer program, computer program product and system are also disclosed.

15 Claims, 3 Drawing Sheets

METHODS AND MEANS FOR FAILURE HANDLING IN PROCESS CONTROL SYSTEMS

TECHNICAL FIELD

The technology disclosed herein relates generally to the field of process control, and in particular to methods, a process control system, a device, computer programs and computer program products for handling failures in a process control system.

BACKGROUND

Industrial automation is implemented in various types of industries, such as e.g., oil refineries or oil rigs, and comprises various processes and functions controlled in an automated manner. The automated processes are controlled by a process control system, which has to be highly reliable, ensuring safety and non-interrupted functioning. A typical controller-centric process control system offers a one-out-of-two redundancy in order to increase availability. That is, failures are mitigated by hardware duplication, wherein a backup unit is ready to take over if a current control unit fails. The failed unit needs to be replaced by maintenance personnel in order to restore full redundancy. It may be time consuming to replace the failed unit, especially in process industries located at cumbersome locations such as e.g., at the oil rigs. The automation processes should be run for as short time as possible without proper back-up, i.e., the hardware change should be done as swiftly as possible to ensure back-up safety. This is not always possible, for instance due to the location of the industry. Further, such replacement procedures may cause expensive production losses.

SUMMARY

An objective of the present disclosure is to address and improve various aspects for process control systems, such as handling of failures thereof. A particular objective is to ensure back-up safety and a non-interrupted production of automated processes control by process control systems. Another particular objective is to provide an automated re-instatement of backup, eliminating the need for manual replacing procedures, while still ensuring proper functioning. These objectives and others are achieved by the methods, devices, system, computer programs and computer program products according to the appended independent claims, and by the embodiments according to the dependent claims.

The objective is according to a first aspect achieved by a method in a process control system for handling failures. The process control system comprises a plurality of compute nodes and at least two instances of virtualized distributed control nodes, VDCNs, deployed in a respective compute node of a cluster of at least two compute nodes. A first VDCN is a primary VDCN controlling an automated process and at least a second VDCN is a backup VDCN. The method comprises assigning the role of primary VDCN to the backup VDCN, detecting that the number of instances of the VDCNs is less than a set number, and deploying a new instance of a VDCN in one of the compute nodes.

The objective is according to a second aspect achieved by a computer program for a process control system, for failure handling therein. The computer program comprises computer program code, which, when run on at processing circuitry in the process control system causes the process control system to perform the method according the first aspect.

The objective is according to a third aspect achieved by a computer program product comprising a computer program according to the second aspect and a computer readable means on which the computer program is stored. The computer readable storage medium can be a non-transitory computer readable storage medium.

The objective is according to a fourth aspect achieved by process control system comprising a plurality of compute nodes and at least two instances of virtualized distributed control nodes, VDCNs, deployed in a respective compute node of a cluster of at least two compute nodes. A first VDCN is a primary VDCN controlling an automated process and at least a second VDCN is a backup VDCN. The process control system comprising means for: assigning the role of primary VDCN to the backup VDCN, to detect that the number of instances of the VDCNs is less than a set number, and to deploy a new instance of a VDCN in one of the compute nodes.

The objective is according to a fifth aspect achieved by a device in a process control system for handling failures. The process control system comprises a plurality of compute nodes and at least two instances of virtualized distributed control nodes, VDCNs, deployed in a respective compute node of a cluster of at least two compute nodes. A first VDCN is a primary VDCN controlling an automated process and at least a second VDCN is a backup VDCN. The device is configured to: detect that the number of instances of the VDCNs is less than a set number and deploying a new instance of a VDCN in one of the compute nodes.

The objective is according to a sixth aspect achieved by a virtualized distributed control node, VDCN. The VDCN is to be used in a process control system comprising a plurality of compute nodes and at least two instances of virtualized distributed control nodes, VDCNs, deployed in a respective compute node of a cluster of at least two compute nodes. The VDCN is configured to detect that a primary VDCN currently controlling an automated process is missing, and to assign the role of primary VDCN to the VDCN, i.e., to itself.

These aspects provide a number of advantages. For instance, these aspects provide a faster and automated re-instatement of a backup, which rapidly takes the role of the primary to control the automated process. The number of available backups may be set e.g., depending on the available resources and, for instance, the method (first aspect) may hence be seen as a pseudo 100N redundancy instead of the currently conventional 1002. In contrast to the prior art, these aspects provide an automated re-instatement of backup, without any intervention by a human. Both the availability and reliability of control services are increased as the mean time to perform a replacement can be greatly lowered compared to prior art. Further, no spare parts need to be fetched as the spare capacity, e.g., in the form of hardware capacity, may already be connected to the cluster of compute nodes.

Further objectives, features, and advantages of the embodiments of the present teachings will become clear upon reading the following description and claims, as well as the accompanying drawings.

BRIEF DESCRIPTION OF THE DRAWINGS

The inventive concept is now described, by way of example, with reference to the accompanying drawings, in which.

DETAILED DESCRIPTION

Figure 1:
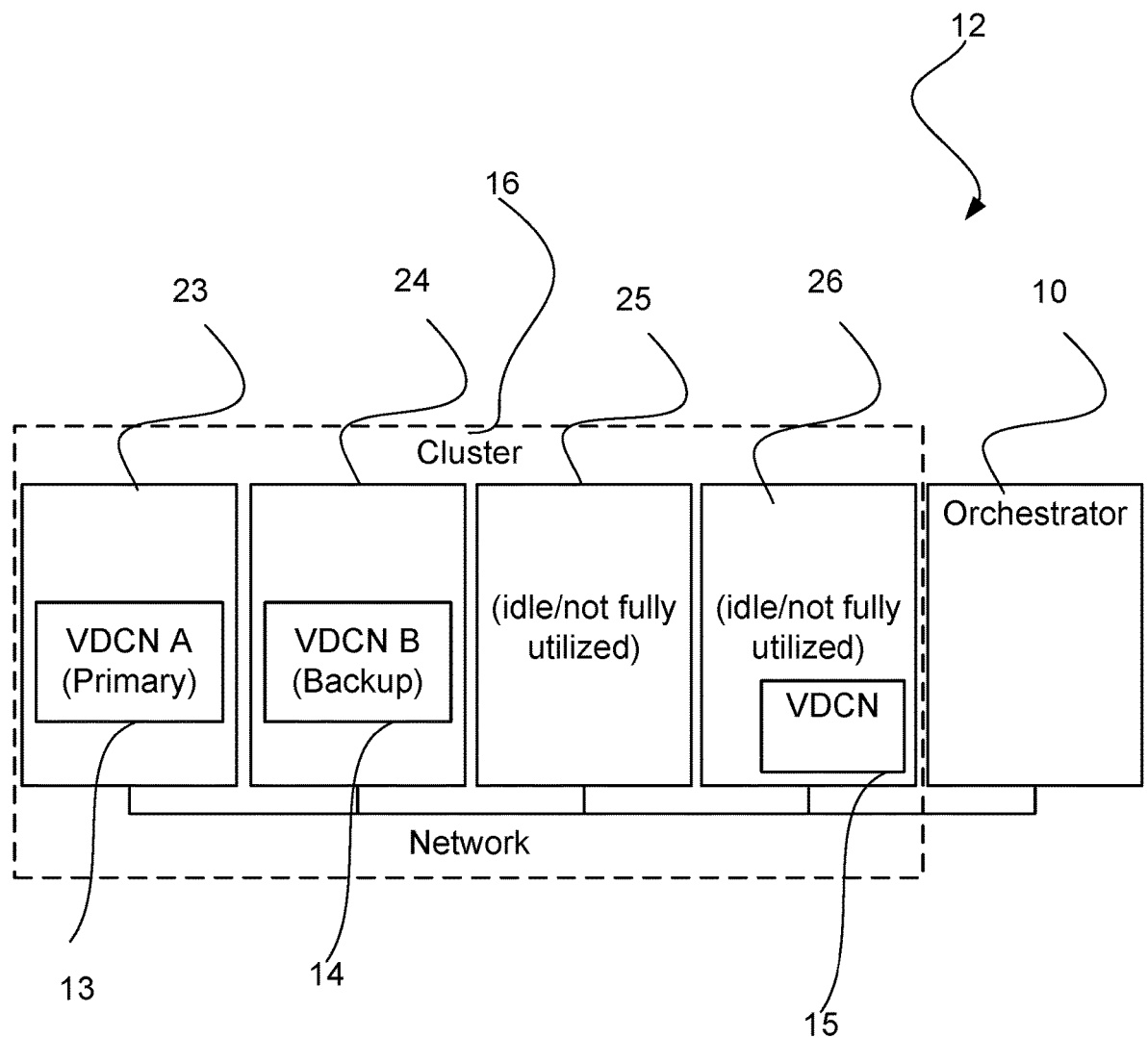
FIG. 1 is a schematic illustration of an environment in which embodiments may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Virtualization, both as virtual machines (VMs) and as containers, is the foundation of cloud solutions. VMs and containers differ in several ways, one difference being that containers provide a way to virtualize an operating system (OS) so that multiple workloads can run on a single OS instance, while with VMs, the hardware is being virtualized to run multiple OS instances. Container management systems are often referred to as container orchestrators or just orchestrators and provide cloud elasticity. The orchestrator can instantiate new containers on available hardware resources when needed.

The herein presented embodiments take advantage of the fact that this virtualization technology can be adapted and used to manage controllers and/or services. The term Distributed Control Node (DCN) is used in this application when referring to a controller running on dedicated hardware. The term Virtual Distributed Control Node (VDCN) refers to a virtualized, containerized DCN, basically the virtualized DCN firmware. It is noted that virtualization, containers, and orchestrators are used only as illustrative examples, and that there are other ways to implement the herein presented embodiments.

FIG. 1 is a schematic illustration of an environment in which embodiments may be implemented. A process control system 12 is illustrated, comprising a plurality of compute nodes 23, 24, 25, 26. In preferred embodiments, the process control system 12 comprises at least two compute nodes 23, 24 in order to enable handling of hardware failure as well as software failures. The compute nodes 23, 24, 25 comprises, among themselves, at least two instances 13, 14 of VDCNs deployed in a respective compute node 23, 24, 25, 26 of a cluster 16 of at least two compute nodes 23, 24, 25, 26. A first VDCN is a primary VDCN 13, which is currently controlling an automated process in, for instance, an industrial automation environment. The process control system 12 also comprises at least a second VDCN 14, which is functioning as a backup VDCN in case the primary VDCN 13 should fail. The primary VDCN 13 and the backup VDCN 14 being deployed in different compute nodes 23, 24 ensures handling also of hardware failures.

A device 10 is provided, in various embodiments, for ensuring uninterrupted operation of the process control system 12. In FIG. 1, the device 10 is exemplified by an orchestrator. Network orchestration refers to actions that e.g., a network controller performs in setting up devices, applications, and services in the network to achieve set objectives. However, the device 10 may be any of a number of devices, for instance a VDCN, a primary VDCN, a backup VDCN, firmware, a container, an orchestrator, an orchestrator running on a dedicated machine, an orchestrator running on an edge device of the process control system 12, control plane, and an edge device of the process control system 12. In some embodiments, the device 10 may be implemented such that the functions are distributed among two or more VDCNs. In the following the device 10 is exemplified by an orchestrator.

The cluster 16 is the hardware resources that the orchestrator 10 is aware of and can use for VDCN deployment. The compute nodes 23, 24, 25, 26 are the nodes that the cluster 16 consists of, i.e., the physical devices arranged to execute the controlling of the automated processes. The compute nodes 23, 24, 25, 26 may, for instance, be embedded devices such as Raspberry Pis, industrial personal computers (PC), Distributed Control Node Hardware, which is purposefit, high-end hardware for industrial use, powerful PCs or servers. The orchestrator 10 may, for instance, run on a dedicated machine that may, but need not, be a compute node. In an industrial context, an edge device might be suitable for running the orchestrator 10, as illustrated in FIG. 1. The edge device is typically a computationally competent device (or devices) located at the edge of the control network and acts as a gateway and as data pre-processor towards the cloud. Often the edge device is not just a single device, instead it may comprise of several devices to form an on-premises edge cloud, a cloud that may have an orchestrator.

In many control systems, it is desirable to have one and only one primary VDCN at any given time. If not having only one primary VDCN, an alternative is to vote in the consumers of the data produced in the Distributed Control Node (DCN), which would typically be the I/O or I/O connectivity. However, in a generic system with support for a third party, it would not be possible to require all I/O to support voting, and therefore the use of only one primary is preferred.

In the various embodiments of the present teachings, provides a combination of, on the one hand, failure detection and redeployment of, for instance, containers provided by the orchestrator 10 and, on the other hand, a DCN network-based state transfer, role selection, and failure detection. The combination results in a process control system 12 where a primary VDCN 13 is active and controlling the I/O (not illustrated). If the primary VDCN 13 fails, the backup VDCN 14 resumes operation, while at the same time, the orchestrator 10 redeploys a replacement VDCN 15 for the failed VDCN in another compute node 26 with available resources. For example, if a hardware failure occurs in a first compute node 23, the backup VDCN 14 becomes the primary, and the orchestrator 10 deploys a new VDCN 15 on e.g., a fourth compute node 26. This presented combination results in a pseudo 100N redundancy, where N is the number of compute nodes 23, 24, 25, 26 in the cluster 16 of compute nodes that can host the redeployed backup.

The present teachings describe, in various embodiments, a kind of orchestration of high-availability VDCNs, realized with a layered architecture: the orchestration layer and the VDCN layer. Each layer has its own supervision mechanism of the VDCNs. The combination of the two yields a high availability redundancy and ensures a bumpless takeover by the backup. The rapid failover handling is handled by the VDCN layer and the redundancy mechanism within that, and the reinstatement of the backup is handled by the orchestration layer.

Figure 2:
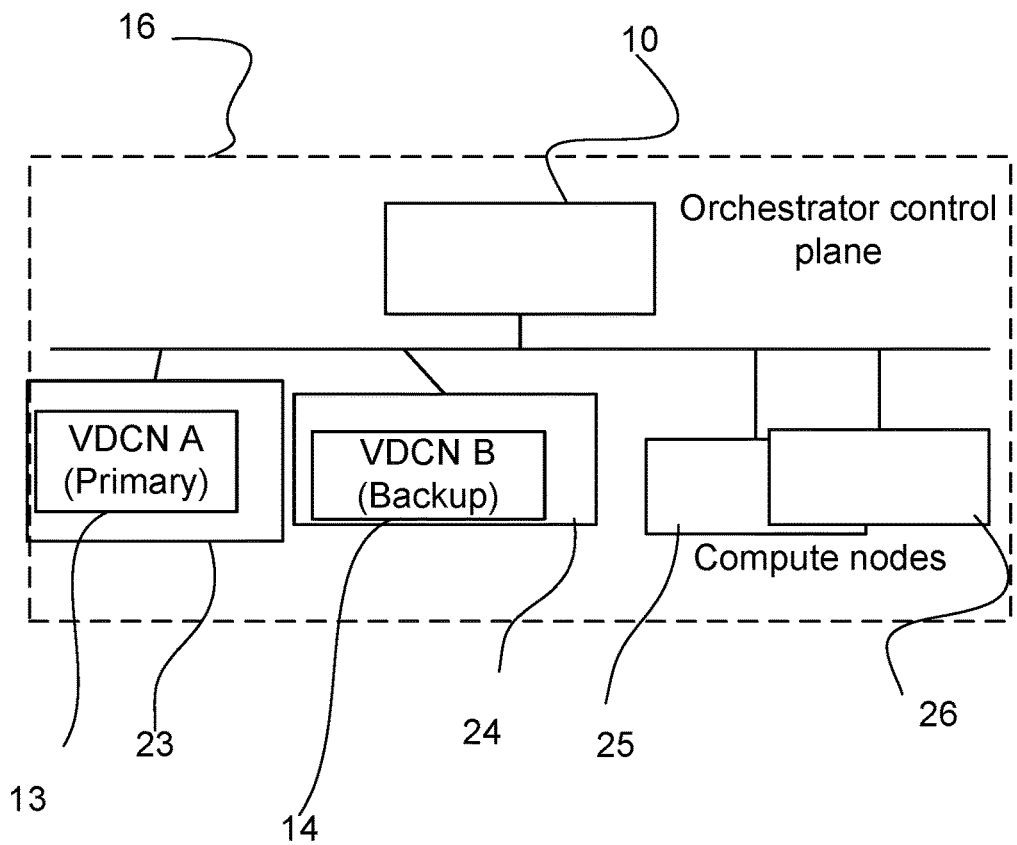
FIG. 2 illustrates an exemplary use case.

FIG. 2 illustrates an exemplary use case, comprising an orchestration layer and a VDCN layer, both of which are described next.

Orchestration Layer

The orchestrator 10 is configured to have at least two instances 13, 14 of the redundant VDCN running in at least two different compute nodes of the cluster 16. The orchestrator 10 is arranged to supervise that the number of VDCN instances matches a configured number. If there is a missing VDCN (e.g., due to a failure), the orchestrator 10 is arranged to deploy a new VDCN, provided that there are enough resources in the cluster 16. In preferred embodiments, a minimum of three compute nodes are used. The orchestrator 10 may be provided with various features. For instance, the orchestrator 10 may be configurable for a selectable number of instances of VDCNs. The number may be set depending, for instance, on the type of automation process at hand. The orchestrator 10 comprises means to supervise that the number of instances of VDCNs is the expected and may be configured to strive to maintain the configured number of instances of VDCNs. This may be implemented in different ways, for instance querying the VDCN(s) and await the response(s) therefrom, and based on the response(s) take appropriate action The orchestrator 10 is able to deploy new instances of VDCNs on available cluster resources, when it deems that there is a need for it. This is typically the case when the primary VDCN has failed. The orchestrator is able to gather, e.g., actively poll and/or receive, relevant metrics from the cluster, metrics that it needs to, e.g., determine where a VDCN can be deployed. Examples of such metrics comprise: number of nodes available, CPU usage, CPU quota available, memory usage and pressure (accesses per time unit), disk usage and pressure (accesses per time unit).

VDCN Layer

Three mechanisms are provided for obtaining a failure handling giving a bumpless failover. These mechanisms may be used to achieve the corresponding advantages obtained when using a redundant DCN.

The mechanisms are:
Failure detection—to detect that the primary has failed.
State transfer: This is to enable the backup VDCN to resume where the primary VDCN left of. The state transfer can be implemented in different ways, e.g., by directly transfer the state from the primary VDCN to the backup VDCN, or by making the primary state available for the backup VDCN, e.g. by sharing the state in, for instance, a cloud environment, or else way making the state available such that the backup VDCN may access it.
Role selection—in simultaneous startup or in case of a plurality of backups, the role selection will ensure that only one of the backups becomes the new primary when the former fails. It is noted that the failure may be a failure in the compute node, or in the VDCN.

With the above mechanism(s), a set of VDCNs configured for redundancy can determine amongst themselves (or, in some embodiments, be instructed) which individual VDCN is the primary and detect when that role of being the primary should change and backup should resume this role.

It is noted that two instances of VDCNs are required, but the teachings are not limited to two instances. In case even higher availability is desired, a higher number of instances of VDCNs is possible, and the role selection is a key to that. In some cases, a single VDCN may be used, e.g., when the automated process at hand is such that longer periods of time without active control is tolerable. Then only the state transfer is required in the VDCN layer, which may be accomplished by a network share where a replacing VDCN can access the latest state. However, in the description, the use of two instances of VDCNs is used as an exemplary case since it is the most common use case and used in the following exemplary use case.

The process control system 12, e.g. the orchestrator 10 thereof is, in various embodiments, configured to strive towards two instances of the VDCN 13, 14 on two different compute nodes 23, 24 in the cluster 16. The orchestrator 10 may be configured by an engineering tool. The orchestrator 10 deploys the VDCN 13, 14 on the two different nodes 23, 24. The role selection (or assignment) ensures that one of them becomes primary and the other backup. The backup VDCN 14 is synchronized with the latest primary states using a network, for instance using a network-based state transfer protocol. The VDCNs 13, 14 are running, wherein the primary is controlling the I/O, being fieldbus master, running the control application, and publishing signal/variable values in the network, etc. The backup VDCN 14 is running in redundant mode. When a failure happens on compute node 23 that is hosting the primary VDCN 13, a failure detection, e.g., in the backup VDCN 14, detects that and the role selection assigns it the new role as primary. The orchestrator 10 detects that only one VDCN exists and deploys a new one on an available compute node, i.e., a compute node having resources for it. The redundancy is restored, without human intervention.

Compared to the state of art, the method provides several advantages, such as: automated re-instatement of backup; higher availability and/or reliability owing to lower mean time to repair; no spare parts need to be fetched; spare capacity may already be connected to the cluster.

Embodiments disclosed herein relate to handling of failures in a process control system 12, which is arranged to control an automated process, such as, for instance, drilling process automation, automation of oil rigs, robotic process automation, automated production or assembly lines etc. In order to provide improvements for failure handling in a process control system, a method performed in a process control system 12 for handling failures in the process control system 12, a process control system 12, a computer program product comprising code, e.g., in the form of a computer program that when run on means, e.g., processing circuitry or a computer, causes the process control system 12 to perform the method, a device 10, and a method performed by the device 10. The method in the process control system 12 may be performed in a distributed manner.

Figure 3:
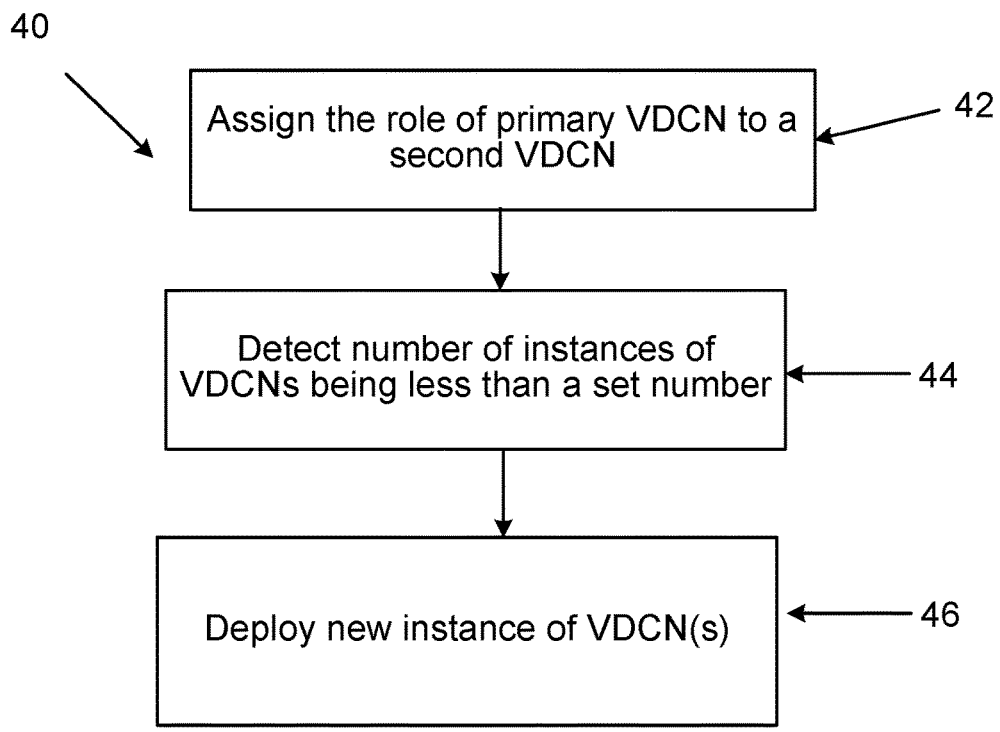
FIG. 3 is a flowchart of a method according to embodiments.

FIG. 3 is a flowchart of a method according to embodiments. A method 40 in a process control system 12 is provided for handling failures. The process control system 12 has been described, and comprises a plurality of compute nodes 23, 24, 25 and at least two instances 13, 14, 15 of virtualized distributed control nodes, VDCNs, deployed in a respective compute node 23, 24, 25 of a cluster of at least two compute nodes 23, 24, 25. A first VDCN is a primary VDCN 13 controlling an automated process and at least a second VDCN is a backup VDCN 14.

The method 40 comprises assigning 42 the role of primary VDCN 13 to the backup VDCN 14. This step may be performed in the backup VDCN 14, as has been described earlier.

The method 40 further comprises detecting 44 that the number of instances of the VDCNs 13, 14, 15 is less than a set number. This step may be performed in the device 10, for instance by the orchestrator 10, as has been described and exemplified earlier. The detecting 42 may be implemented in different ways. In an embodiment, the detecting comprises detecting that there is one VDCN missing, i.e., that a configured number of VDCNs differs from the expected one. The VDCN may be missing due to a failure in at least one of: a first compute node 23 on which the primary VDCN 13 is deployed and the primary VDCN 13.

The method 40 comprises deploying 46 a new instance of a VDCN 15 in one of the compute nodes 23, 24, 25. This step may also be performed by the orchestrator 12 of the process control system 12. In an embodiment, the step of assigning 42 is thus performed in the backup VDCN 14 (the backup VDCN 14 becomes the primary VDCN), while the steps of detecting 44 and deploying 46 are performed by the orchestrator 10 of the process control system 12. In other embodiments, the steps of assigning 42 and detecting 44 are performed in the backup VDCN while the deploying is performed by the orchestrator 10.

It is noted that the described steps 42, 44, 46 may be performed in another order, and that e.g., steps 42 and 44 may be performed essentially simultaneously. It is also noted (and exemplified earlier) that the method 40 may be implemented to be performed in a distributed manner within the process control system 12, wherein the steps 42, 44, 46 are performed by two or more entities.

In an embodiment, the assigning 42 is performed in the backup VDCN 14 and the detecting 44 is performed in a device 10 of the process control system 12.

In various embodiments, the method 40 comprises detecting a failure in at least one of: a first compute node 23 on which the primary VDCN 13 is deployed and the primary VDCN 13. This step may, for instance, be performed by a failure detection function in the backup VDCN 14.

In various embodiments, the method 40 comprises cyclically synchronizing at least the backup VDCN 14 with the latest primary states. Such synchronizing may be performed for several VDCNs if necessary in view of, for instance, the automated processes at hand, that the process control system 12 is controlling. A transfer of the state from the primary VDCN to the (new) backup VDCN can be made, which enables the backup VDCN to resume where the failed primary VDCN 13 left off. The synchronization can be instructed by the orchestrator 10 and the backup VDCN 14 may perform it, or the synchronization can be made entirely by the backup VDCN 14.

The method 40 for handling failures in a process control system 12 may be implemented in one or more devices 10, 14 cooperating. In embodiments wherein two or more devices 10, 14 are cooperating, the steps of the method may be divided in different way as has been described. The device may, for instance, be one or more of: a virtualized distributed control node (VDCN), a primary VDCN, a backup VDCN, firmware, a container, an orchestrator, an orchestrator running on a dedicated machine, an orchestrator running on an edge device of the process control system 12, control plane, and an edge device of the process control system 12. The process control system 12 comprises two or more instances 13, 14, 15 of VDCN, wherein a first VDCN and a second VDCN are deployed in a respective compute node 23, 24, 25 of a cluster of compute nodes 23, 24, 25. The number of required compute nodes is thus at least two. The first VDCN is a primary VDCN 13 and is controlling an automated process, whereas the second VDCN 14 is a backup VDCN, to be used in case of a failure. There may be several backup VDCNs, for instance, in case the process control system 12 is controlling a highly critical automation process or is vulnerable to failures.

A corresponding process control system 12 is also provided. The process control system 12 comprises a plurality of compute nodes 23, 24, 25 and at least two instances 13, 14, 15 of virtualized distributed control nodes, VDCNs, deployed in a respective compute node 23, 24, 25 of a cluster of at least two compute nodes 23, 24, 25. A first VDCN is a primary VDCN 13 controlling an automated process and at least a second VDCN is a backup VDCN 14.

The process control system 12 comprises means for assigning the role of primary VDCN to the backup VDCN 14, means for detecting that the number of instances 13, 14, 15 of the VDCNs is less than a set number and means for deploying a new instance 15 of a VDCN in one of the compute nodes 23, 24, 25. Such means may, as has been described earlier, e.g., in relation to FIG. 3, comprise a device 10 and/or a VDCN performing all or some of the steps. The means may comprise computer means programmed to carry out the steps. Such computer means may be executed in a single device, or in a distributed manner among two or more devices.

In an embodiment, the process control system the backup VDCN 14 comprises a failure detection configured to detect the new role as primary VDCN.

In an embodiment, the process control system 12 comprises a device 10 configured to ensure existence in the process control system 12 of at least two instances of VDCNs on a respective computer node 23, 24, 25.

A device 10 is also provided to be used in the described process control system 12 for handling failures. The device 10 is configured to detect that the number of instances of the VDCNs 13, 14, 15 is less than a set number and to deploy a new instance of a VDCN 15 in one of the compute nodes 23, 24, 25. The device 10 may be one of: a virtualized distributed control node, VDCN, a primary VDCN, a backup VDCN, a firmware, a container, an orchestrator, an orchestrator running on a dedicated machine, an orchestrator running on an edge device of the process control system 12, control plane, and an edge device of the process control system 12.

A virtualized distributed control node, VDCN, 14 is also provided, for use in the described process control system 12. The VDCN 14, in particular a backup VDCN, is configured to detect that a primary VDCN 13 controlling an automated process is missing. That is, the number of instances of the VDCNs 13, 14, 15 is less than a set number. This detection may, as has been described, be performed in various ways. The backup VDCN 14 is further configured to assign the role of primary VDCN to the backup VDCN 14, i.e., to itself. The backup VDCN 14 thus becomes the primary VDCN and is controlling the automated process at hand. This can be achieved rapidly and without human intervention. If there are at least three compute nodes, each comprising a deployed VDCN instance, there is no need for an immediate replacement of a compute node and/or VDCN (depending on what type of failure that has occurred), since there are still a primary VDCN controlling the automated process(es) and another backup VDCN ready to assume the role of primary VDCN. In cases where there are two compute nodes, one in which the primary VDCN is deployed and one in which the backup VDCN is deployed, there is still no interruption of the automated processes, and thus no production losses. In such cases, wherein maintenance personnel need to replace the failed unit in order to restore full redundancy, it does not necessarily need to be done immediately.

It is noted that there may be more than one backup VDCN, and that e.g., two backup VDCNs may be supervising that the primary VDCN is functioning properly. In such case one of the backup VDCNs may be assigned the role of primary VDCN and the other may be assigned (or keep) the role of backup VDCN.

In an embodiment, the detecting is performed by a failure detection function of the first VDCN 14.

Figure 4:
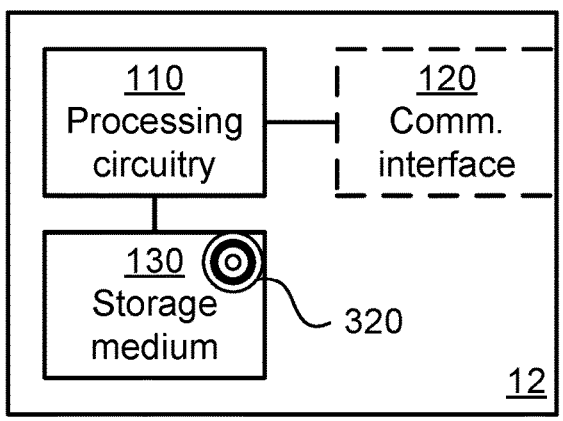
FIG. 4 is a schematic diagram showing functional units of a device according to an embodiment.

FIG. 4 schematically illustrates, in terms of a number of functional units, the components of a process control system according to an embodiment. Processing circuitry 110 is provided using any combination of one or more of a suitable central processing unit (CPU), multiprocessor, microcontroller, digital signal processor (DSP), etc., capable of executing software instructions stored in a computer program product (as in FIG. 6), e.g., in the form of a storage medium 130. The processing circuitry 110 may further be provided as at least one application specific integrated circuit (ASIC), or field programmable gate array (FPGA).

Particularly, the processing circuitry 110 is configured to cause the process control system 12 to perform a set of operations, or actions, as disclosed above. For example, the storage medium 130 may store the set of operations, and the processing circuitry 110 may be configured to retrieve the set of operations from the storage medium 130 to cause the process control system 12 to perform the set of operations. The set of operations may be provided as a set of executable instructions. The processing circuitry 110 is thereby arranged to execute methods as herein disclosed.

The storage medium 130 may also comprise persistent storage, which, for example, can be any single one or combination of magnetic memory, optical memory, solid state memory or even remotely mounted memory.

The device 10 may further comprise a communications interface 120 for communications with other entities, functions, nodes, and devices, over the interfaces. As such the communications interface 120 may comprise one or more transmitters and receivers, comprising analogue and digital components.

The processing circuitry 110 controls the general operation of the process control system 12 e.g., by sending data and control signals to the communications interface 120 and the storage medium 130, by receiving data and reports from the communications interface 120, and by retrieving data and instructions from the storage medium 130. Other components, as well as the related functionality, of the process control system 12 are omitted in order not to obscure the concepts presented herein.

Figure 5:
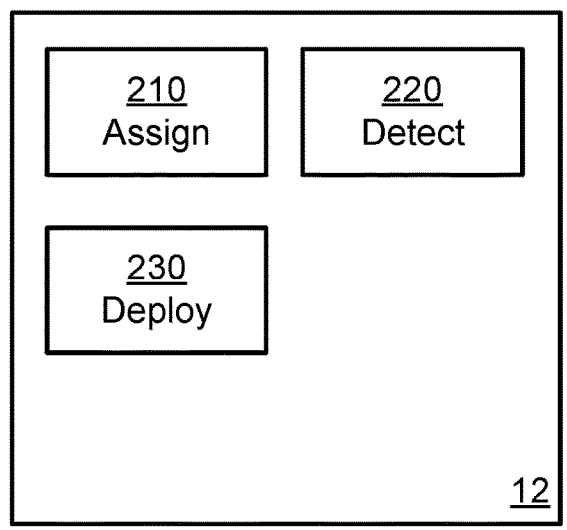
FIG. 5 is a schematic diagram showing functional modules of a device according to an embodiment.

FIG. 5 schematically illustrates, in terms of a number of functional modules, components of a process control system 12 according to an embodiment. The process control system 12 comprises a number of functional modules; an assign module 210 configured to perform step 42, a detect module 220 configured to perform step 44 and a deploy module 230 configured to perform step 46. The process control system 12 of FIG. 5 may further comprise a number of optional functional modules implementing the various method steps described herein. In general terms, each functional module 210, 220, 230 may be implemented in hardware or in software. Preferably, one or more or all functional modules 210, 220, 230 may be implemented by the processing circuitry 110, possibly in cooperation with the communications interface 120 and the storage medium 130. The processing circuitry 110 may thus be arranged to from the storage medium 130 fetch instructions as provided by a functional module 210, 220, 230 and to execute these instructions, thereby performing any actions of the process control system 12 as disclosed herein.

Figure 6:
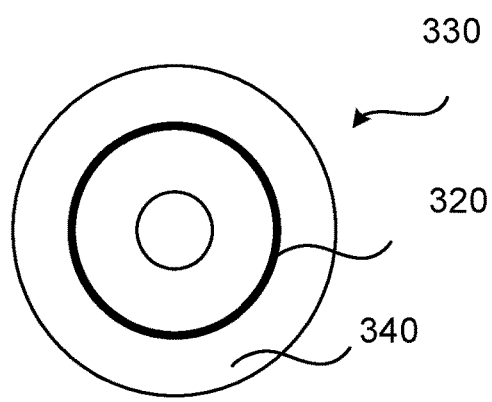
FIG. 6 shows one example of a computer product comprising computer readable storage medium according to an embodiment.

FIG. 6 shows one example of a computer product comprising computer readable storage medium according to an embodiment. On this computer readable means 340, a computer program 320 can be stored, which computer program 320 can cause the processing circuitry 110 and thereto operatively coupled entities and devices, such as the communications interface 120 and the storage medium 130, to execute methods according to embodiments described herein. The computer program 320 and/or computer program product 330 may thus provide means for performing any actions of the process control system 12, and devices 10, 14 as herein disclosed. On this computer readable means 330, a computer program 320 can be stored, which computer program 320 can cause the processing circuitry 110 and thereto operatively coupled entities and devices, such as the communications interface 120 and the storage medium 130, to execute methods according to embodiments described herein. The computer program 320 and/or computer program product 330 may thus provide means for performing any actions of the process control system 12 as herein disclosed.

In the example of FIG. 6, the computer program product 330 is illustrated as an optical disc, such as a CD (compact disc) or a DVD (digital versatile disc) or a Blu-Ray disc. The computer program product 330 could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 330.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method in a process control system for handling failures in an industrial automation environment, the process control system comprising a plurality of compute nodes and at least two instances of virtualized distributed control nodes, VDCNs, deployed in a respective compute node of a cluster of at least two compute nodes, wherein a first VDCN is a primary VDCN controlling an automated process via a field bus and at least a second VDCN is a backup VDCN running in redundant mode, the method comprising:
  assigning the role of primary VDCN to the backup VDCN, and
  detecting that the number of instances of the VDCNs is less than a set number, and
  deploying a new instance of a VDCN in one of the compute nodes.

2. The method as claimed in claim 1, wherein the assigning is performed in the backup VDCN and wherein the detecting is performed in a device of the process control system.

3. The method as claimed in claim 1, comprising detecting a failure in at least one of: a first compute node on which the primary VDCN is deployed and the primary VDCN.

4. The method as claimed in claim 1, comprising cyclically synchronizing at least the backup VDCN with the latest primary states.

5. A computer program for a process control system in an industrial automation environment, the process control system having a plurality of compute nodes and at least two instances of virtualized distributed control nodes, VDCNs, deployed in a respective compute node of a cluster of at least two compute nodes, wherein a first VDCN is a primary VDCN controlling an automated process via a field bus and at least a second VDCN is a backup VDCN running in redundant mode, wherein the computer program comprises computer program code, which, when run on processing circuitry in the process control system, causes the process control system to perform a method, which includes:
assigning the role of primary VDCN to the backup VDCN, and
detecting that the number of instances of the VDCNs is less than a set number, and
deploying a new instance of a VDCN in one of the compute nodes.

6. A computer program product comprising a computer program for a process control system in an industrial automation environment, the process control system having a plurality of compute nodes and at least two instances of virtualized distributed control nodes, VDCNs, deployed in a respective compute node of a cluster of at least two compute nodes, wherein a first VDCN is a primary VDCN controlling an automated process via a field bus and at least a second VDCN is a backup VDCN running in redundant mode, wherein the computer program comprises computer program code, which, when run on processing circuitry in the process control system, causes the process control system to perform a method, which includes:
assigning the role of primary VDCN to the backup VDCN, and
detecting that the number of instances of the VDCNs is less than a set number, and
deploying a new instance of a VDCN in one of the compute nodes and a computer readable means on which the computer program is stored.

7. A process control system in an industrial automation environment, the system comprising a plurality of compute nodes and at least two instances of virtualized distributed control nodes, VDCNs, deployed in a respective compute node of a cluster of at least two compute nodes, wherein a first VDCN is a primary VDCN controlling an automated process via a field bus and at least a second VDCN is a backup VDCN running in redundant mode, the process control system comprising means for:
assigning the role of primary VDCN to the backup VDCN,
detecting that the number of instances of the VDCNs is less than a set number, and
deploying a new instance of a VDCN in one of the compute nodes.

8. The process control system as claimed in claim 7, wherein the backup VDCN comprises a failure detection configured to detect the new role as primary VDCN.

9. The process control system as claimed in claim 7, comprising a device configured to ensure existence in the process control system of at least two instances of VDCNs on a respective computer node.

10. A device in a process control system for handling failures in an industrial automation environment, wherein the process control system comprises a plurality of compute nodes and at least two instances of virtualized distributed control nodes, VDCNs, deployed in a respective compute node of a cluster of at least two compute nodes, wherein a first VDCN is a primary VDCN controlling an automated process via a field bus and at least a second VDCN is a backup VDCN running in redundant mode, the device being configured to:
detect that the number of instances of the VDCNs is less than a set number, and
deploying a new instance of a VDCN in one of the compute nodes.

11. The device as claimed in claim 10, wherein the device is one of: a virtualized distributed control node, VDCN, a primary VDCN, a backup VDCN, a firmware, a container, an orchestrator, an orchestrator running on a dedicated machine, an orchestrator running on an edge device of the process control system, control plane, and an edge device of the process control system.

12. A virtualized distributed control node, VDCN, in a process control system in an industrial automation environment including a plurality of compute nodes and at least two instances of virtualized distributed control nodes, VDCNs, deployed in a respective compute node of a cluster of at least two compute nodes, the virtualized distributed control node, VDCN, being configured to:
detect that a primary VDCN controlling an automated process is missing, and
assign the role of primary VDCN to the VDCN, and
control the automated process as the primary VDCN via a field bus.

13. The VDCN as claimed in claim 12, wherein the detecting is performed by a failure detection function of the VDCN.

14. The method as claimed in claim 2, comprising detecting a failure in at least one of: a first compute node on which the primary VDCN is deployed and the primary VDCN.

15. The method as claimed in claim 2, comprising cyclically synchronizing at least the backup VDCN with the latest primary states.

* * * * *